(12) United States Patent
Ikeda et al.

(10) Patent No.: US 9,359,926 B2
(45) Date of Patent: Jun. 7, 2016

(54) GAS TREATMENT DEVICE AND INTERNAL COMBUSTION ENGINE

(75) Inventors: Yuji Ikeda, Kobe (JP); Shigeo Miyake, Nishinomiya (JP)

(73) Assignee: IMAGINEERING, INC., Hyogo (JP)

( * ) Notice: Subject to any disclaimer, the term of this patent is extended or adjusted under 35 U.S.C. 154(b) by 664 days.

(21) Appl. No.: 13/496,545

(22) PCT Filed: Sep. 17, 2010

(86) PCT No.: PCT/JP2010/066260
§ 371 (c)(1),
(2), (4) Date: Jul. 30, 2012

(87) PCT Pub. No.: WO2011/034189
PCT Pub. Date: Mar. 24, 2011

(65) Prior Publication Data
US 2012/0285146 A1 Nov. 15, 2012

(30) Foreign Application Priority Data
Sep. 17, 2009 (JP) .................... 2009-216274

(51) Int. Cl.
*B03C 3/38* (2006.01)
*F01N 3/01* (2006.01)
(Continued)

(52) U.S. Cl.
CPC ..... *F01N 3/01* (2013.01); *B01D 53/92* (2013.01); *H05H 1/46* (2013.01); *B01D 2257/708* (2013.01); *B01D 2258/01* (2013.01);
(Continued)

(58) Field of Classification Search
CPC ............. B01D 53/92; B01D 2257/708; B01D 2258/01; B01D 2259/818; F01N 3/01; F01N 2240/28; H05H 1/46; H05H 2001/463; H05H 2240/28; H05H 2240/10; H05H 2245/121; H05H 2245/1215
USPC .......... 60/275; 423/213.2, 213.5; 315/111.01, 315/111.11, 111.21
See application file for complete search history.

(56) References Cited

U.S. PATENT DOCUMENTS

| 5,492,678 A * | 2/1996 | Ota et al. ................. 422/174 |
| 8,367,005 B2 * | 2/2013 | Ikeda et al. .............. 422/186 |
| 2010/0200390 A1 | 8/2010 | Ikeda et al. |

FOREIGN PATENT DOCUMENTS

| JP | 9-201527 A | 8/1997 |
| JP | 2002-249877 A | 9/2002 |

(Continued)

OTHER PUBLICATIONS

International Search Report of PCT/JP2010/066260, mailing date of Nov. 9, 2010.

*Primary Examiner* — Kenneth Bomberg
*Assistant Examiner* — Brandon Lee
(74) *Attorney, Agent, or Firm* — Westerman, Hattori, Daniels & Adrian, LLP

(57) ABSTRACT

A gas treatment device includes an electric discharger, an electromagnetic wave oscillator, an antenna, and a fan. The electric discharger ionizes gas in a target space. The electromagnetic wave oscillator oscillates an electromagnetic wave to be radiated to the target space. The electromagnetic wave is radiated by the antenna toward a gas ionization region in which gas ionized by the electric discharger is provided. The electric discharger ionizes gas and the antenna radiates the electromagnetic wave thereto to generate plasma. The fan moves at least a part of the electric discharger, thereby changing a location of the gas ionization region, thereby moving the location of the plasma.

2 Claims, 7 Drawing Sheets

(51) Int. Cl.
*B01D 53/92* (2006.01)
*H05H 1/46* (2006.01)

(52) U.S. Cl.
CPC ....... *B01D2259/818* (2013.01); *F01N 2240/28* (2013.01); *H05H 2001/463* (2013.01); *H05H 2240/10* (2013.01); *H05H 2245/121* (2013.01); *H05H 2245/1215* (2013.01); *Y02T 10/20* (2013.01)

(56) References Cited

FOREIGN PATENT DOCUMENTS

| | | |
|---|---|---|
| JP | 2004-89753 A | 3/2004 |
| JP | 2007-113570 A | 5/2007 |
| JP | 2009-28705 A | 2/2009 |
| JP | 2009-34674 A | 2/2009 |
| WO | WO 2009008519 A1 * | 1/2009 |

* cited by examiner

GAS TREATMENT DEVICE AND INTERNAL COMBUSTION ENGINE

TECHNICAL FIELD

The present invention relates to a gas treatment device using plasma and an internal combustion engine to which the gas treatment device is applied.

BACKGROUND ART

Conventionally, there is known a gas treatment device using plasma. A gas treatment device of such a type can be used for decomposing and detoxifying various air pollutants such as VOC (Volatile Organic Compounds).

The inventors have proposed a gas treatment device that employs electric discharge and microwave radiation in combination (Patent Documents 1 and 2). For example, the gas treatment device disclosed in Patent Document 2 generates a small-scale plasma by means of a spark discharge and microwave pulses are radiated to the plasma. The energy of the microwave pulses is supplied to charged particles in the plasma, thereby enlarging and growing the plasma.

PATENT DOCUMENTS

Patent Document 1: Japanese Unexamined Patent Application, Publication No. 2007-113570
Patent Document 1: Japanese Unexamined Patent Application, Publication No. 2009-034674

DISCLOSURE OF THE INVENTION

Problems to be Solved by the Invention

In a region in which a plasma is generated (hereinafter, referred to as a "plasma generation region"), temperature and pressure become higher than those of the surrounding regions. Therefore, a gas to be treated tends to avoid the plasma. Since in the conventional gas treatment devices, the plasma is located at a fixed position, it has been difficult to cause a large amount of gas to be reacted using the plasma.

The present invention has been made in view of the above-mentioned facts, and it is an object of the present invention to increase the amount of gas that comes into contact with plasma, and thus improve gas treatment efficiency, in a gas treatment device that generates plasma by ionizing the gas and radiating an electromagnetic wave thereto.

Means for Solving the Problems

A first aspect of the present invention is a gas treatment device, comprising: an ionization unit that ionizes gas in a target space; an electromagnetic wave oscillator that oscillates an electromagnetic wave to be radiated to the target space; an antenna that radiates the electromagnetic wave supplied from the electromagnetic wave oscillator toward a gas ionization region in which gas ionized by the ionization unit is provided, wherein the ionization unit ionizes gas and the antenna radiates the electromagnetic wave thereto to generate plasma; and a movement unit that moves at least a part of the ionization unit, thereby changes the location of the gas ionization region, and changes the location of the plasma.

In accordance with a first aspect of the present invention, plasma is generated in a gas ionization region. The location of the plasma is changed as at least a part of the ionization unit is moved by the movement unit.

A second aspect of the present invention is a gas treatment device as set forth in claim 1, wherein the ionization unit includes an electric discharger that discharges in a discharge gap between a moving electrode moved by the movement unit, and a fixed electrode fixedly provided, the electric discharger includes a plurality of the fixed electrodes, and the moving electrode is moved by the movement unit so that the moving electrode sequentially comes in the vicinity of each of the fixed electrodes and discharge is performed between the moving electrode and each of the fixed electrodes located in the vicinity of each other.

A third aspect of the present invention is a gas treatment device, wherein the ionization unit includes an electric discharger that discharges in a discharge gap between a pair of electrodes, and the electric discharger is moved by the movement unit so that discharge is performed in the discharge gap.

A forth aspect of the present invention is a gas treatment device, wherein the movement unit is a fan that conveys gas, and the ionization unit is disposed so that the gas ionization region is formed at a location where pressure of the gas rises due to blast from the fan.

A fifth aspect of the present invention is an internal combustion engine, comprising: the gas treatment device; and a combustor that combusts the gas introduced there into, wherein the gas treatment device generates a plasma in a gas flow path in which gas to be flowed into the combustor or gas flowed out of the combustor flows.

A sixth aspect of the present invention is an internal combustion engine, further comprising: a compressor that compresses gas to be flowed into the combustor; and a turbine that rotates upon receiving pressure of the gas flowed out of the combustor, wherein the gas treatment device is provided in the compressor, and a rotation mechanism of the compressor serves as the movement unit.

A seventh aspect of the present invention is an internal combustion engine, further comprising: a compressor that compresses gas to be flowed into the combustor; and a turbine that rotates upon receiving pressure of the gas flowed out of the combustor, wherein the gas treatment device is provided in the turbine, and a rotation mechanism of the turbine serves as the movement unit.

A eighth aspect of the present invention is a gas treatment device, comprising: an ionization unit that ionizes gas in a target space; an electromagnetic wave oscillator that oscillates an electromagnetic wave to be radiated to the target space; an antenna that radiates the electromagnetic wave supplied from the electromagnetic wave oscillator toward a gas ionization region in which gas ionized by the ionization unit is provided, wherein the ionization unit ionizes gas and the antenna radiates the electromagnetic wave thereto to generate plasma; and a compression unit that forwards compressed gas to a region where the plasma is generated.

A ninth aspect of the present invention is a gas treatment device, comprising: an ionization unit that ionizes gas in a target space; an electromagnetic wave oscillator that oscillates an electromagnetic wave to be radiated to the target space; and an antenna that radiates the electromagnetic wave supplied from the electromagnetic wave oscillator toward a gas ionization region in which gas ionized by the ionization unit is provided, wherein the ionization unit ionizes gas and the antenna radiates the electromagnetic wave thereto to generate plasma, and a location of a strong electric field generated by the electromagnetic wave is continuously changed after the plasma is generated, by changing a frequency of the electromagnetic wave radiated from the antenna, thereby moving the plasma.

A tenth aspect of the present invention is a gas treatment device, wherein a plurality of the electromagnetic wave oscillators are connected to one antenna, and a location of a region of the strong electric field is continuously changed by changing a wave length of an electromagnetic wave oscillated by at least one of the electromagnetic wave oscillators after the plasma is generated, thereby moving the plasma.

Effects of the Invention

According to the present invention, a movement unit that moves at least a part of an ionization unit is provided so that the location of plasma can be changed. Accordingly, it is possible to disperse regions of high temperatures and pressures, and thus avoid a situation in which only predetermined locations are constantly exposed to high temperatures and pressures. Therefore, an amount of gas that comes into contact with the plasma increases, and it is possible to cause a large amount of gas to be chemically reacted.

BEST MODE FOR CARRYING OUT THE INVENTION

In the following, a detailed description will be given of preferred embodiments according to the present invention with reference to drawings. It should be noted that the following embodiments are mere examples that are essentially preferable, and are not intended to limit the scope of the present invention, applied field thereof, or application thereof.

First Embodiment

In the following, a specific description will be given of a first embodiment according to the present invention with reference to drawings.

Figure 1:
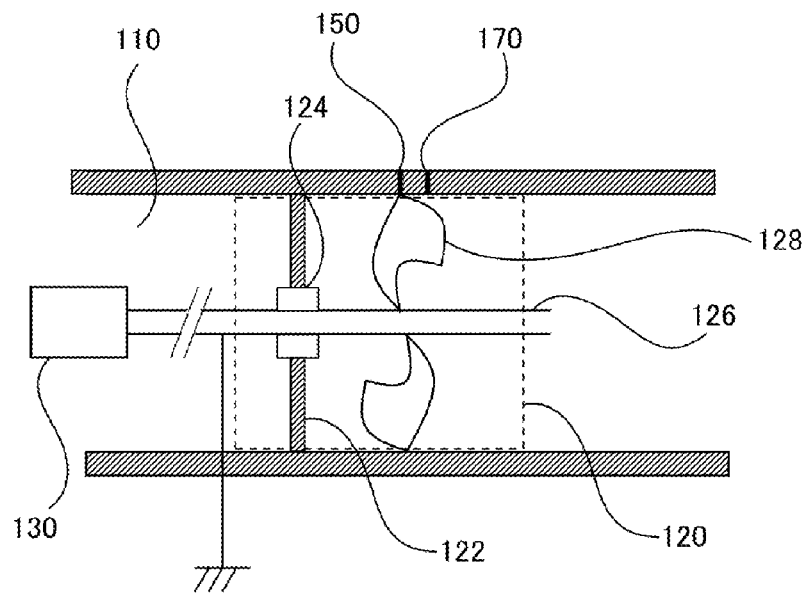
FIG. 1 is a schematic view of a configuration of a gas treatment device according to a first embodiment.
Figure 2:
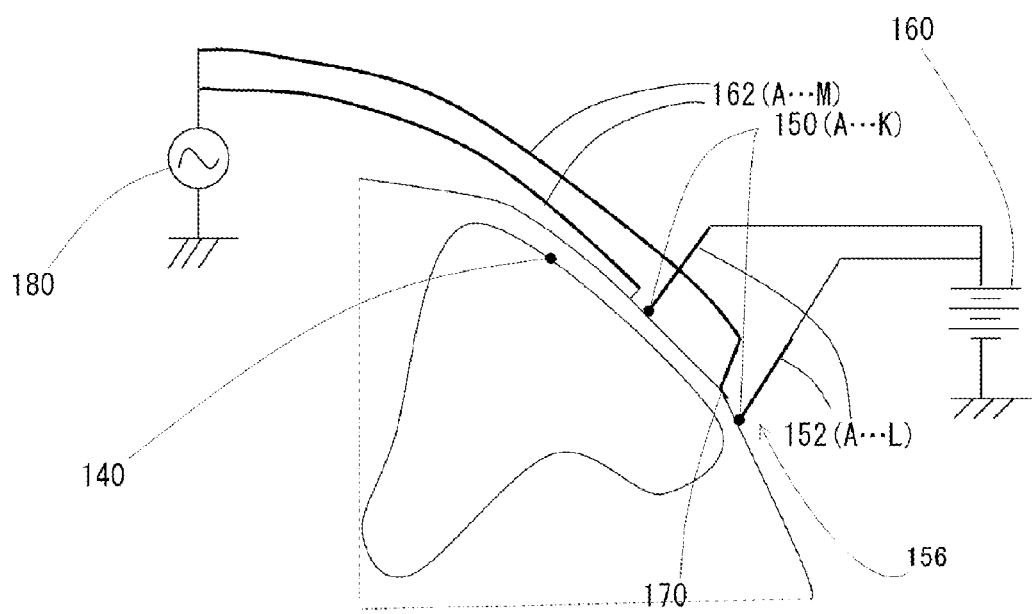
FIG. 2 is a diagram showing an arrangement of electrodes and an antenna.
Figure 3:
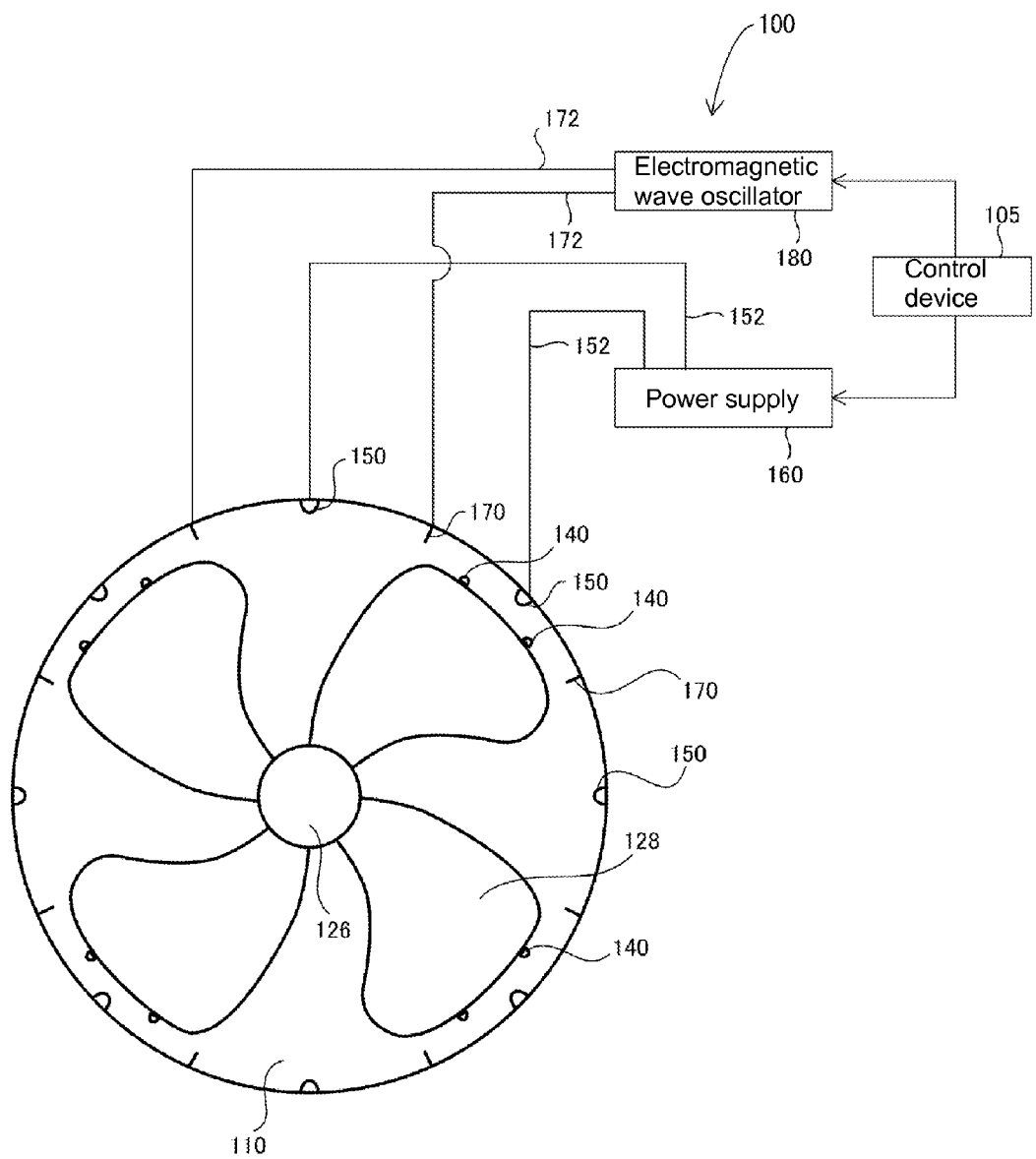
FIG. 3 is a schematic view of a configuration of a gas treatment device viewed from a flow direction of a gas flow path.

The first embodiment is a gas treatment device 100 configured by a gas treatment device according to the present invention. FIGS. 1 to 3 show the gas treatment device 100 of the first embodiment. The gas treatment device 100 is arranged in a gas flow path 110 having an approximately circular cross section in which gas to be treated flows. The gas treatment device 100 is provided with an electric discharger 156, a power supply 160 (direct current power supply), an electromagnetic wave oscillator 180, an antenna 170, and a fan 120. The electric discharger 156 constitutes an ionization unit that ionizes gas in a target space. The electromagnetic wave oscillator 180 generates an electromagnetic wave to be radiated to the target space. The antenna 170 radiates the electromagnetic wave supplied from the electromagnetic wave oscillator 180 toward a gas ionization region in which gas ionized by the ionization unit is provided. In the gas treatment device 100, the ionization unit ionizes gas and the antenna 170 radiates the electromagnetic wave thereto to generate plasma.

The fan 120 constitutes a movement unit that moves at least a part of the ionization unit, thus changes the location of the gas ionization region, and changes the location of the plasma. The fan 120 is an axial flow fan and arranged in the gas flow path 110 formed of a cylindrical member. The fan 120 includes a plurality of fan blades 128, a pivot shaft 126 connected to a center portion of the fan blades 128, a bearing 124 that rotatably supports the pivot shaft 126, a supporting member 122 that supports the bearing 124, and a power source (motor) 130 that provides power to rotate the pivot shaft 126. The supporting member 122 is joined to an inner wall surface of the gas flow path 110. The pivot shaft 126 is arranged coaxially with the gas flow path 110.

The fan blades 128 are joined to the pivot shaft 126. The plurality of fan blades 128 are equidistantly joined on an outer circumferential surface of the pivot shaft 126. Each of the fan blades 128 has a plurality of protruding portions 140 (A, . . . , K) at an outer edge thereof. The protruding portions 140 (A, . . . , K) are provided in such a manner as to protrude toward the vicinity of the inner wall surface of the gas flow path 110.

In the fan 120, when the pivot shaft 126 receives power generated by the power source 130, the pivot shaft 126 and the fan blades 128 rotate, thereby causing the fan 120 to convey gas in the gas flow path 110 in one direction (for example, left to right in FIG. 1). Both the pivot shaft 126 and the fan blades 128 are made of conductive material. Each of the protruding portions 140 is electrically connected to the pivot shaft 126. Since both are made of conductive material, the pivot shaft 126 and the fan blades 128 may be integrally formed with one another.

The pivot shaft 126 is constantly electrically grounded via the bearing 124 and the supporting member 122. Each of the protruded portions 140 is electrically grounded via the pivot shaft 126. Also, the pivot shaft 126 may be constantly electrically grounded via members of the power source 130.

The electric discharger 156 includes a plurality of high voltage electrodes 150 (A, . . . , L), a plurality of ground electrodes 140 (A, . . . , K), and a plurality of DC (Direct Current) electrical paths 152 (A, . . . , L). The plurality of high voltage electrodes 150 are equiangularly provided on the inner wall surface of the gas flow path 110 in such a manner as to be in the vicinity of the outer edges of the fan blades 128. Each of the high voltage electrodes 150 is connected to the power supply 160 via the DC electrical paths 152. The electric discharger 156 is arranged so that the gas ionization regions are formed at locations where gas pressure rises due to blast from the fan 120.

In the present embodiment, each of the protruded portions 140 serves as the ground electrode 140. As the fan blades 128 rotate, each of the high voltage electrodes 150 facing toward and located in the vicinity of the respective one of the protruded portions 140 changes one after another in a circumferential direction. The number of the high voltage electrodes 150 is not required to be equal to the number of the protruded portions 140. The number of the high voltage electrodes 150 may be greater than the number of the protruded portions 140.

The high voltage electrodes 150 are connected to the power supply 160 via the DC electrical paths 152. In FIG. 3, only some of the high voltage electrodes 150 are shown as being connected to the power supply 160 for simplicity of illustration. Actually, all of the high voltage electrodes 150 are connected to the power supply 160.

The gas treatment device 100 is provided with a control device 105 that controls a timing at which the power supply 160 applies a high voltage to the high voltage electrodes 150. The control device 105 causes the power supply 160 to apply a high voltage at the same timing to a pair of the high voltage electrodes 150, from among the plurality of high voltage electrodes 150, assuming that a line passing through one of the pair of the high voltage electrodes 150 and the center of the gas flow path 110 intersects with a line passing through the other one of the pair of the high voltage electrodes 150 and the center of the gas flow path 110 at 90 degrees, since the pair of high voltage electrodes 150 are located in the vicinity of the protruded portions 140 at the same timing. On the other hand, the control device 105 causes the power supply 160 to apply a high voltage at different timings to a pair of the high voltage electrodes 150 (adjacent high voltage electrodes 150), from among the plurality of high voltage electrodes 150, assuming that a line passing through one of the pair of the high voltage electrodes 150 and the center of the gas flow path 110 intersects with a line passing through the other one of the pair of the high voltage electrodes 150 and the center of the gas flow path 110 at 45 degrees, since the pair of high voltage electrodes 150 are located in the vicinity of the protruded portions 140 at the different timings.

The power supply 160 may apply voltage to the degree that causes gas insulation breakdown between the high voltage electrode 150 and the protruded portion 140 in a state in which the high voltage electrode 150 and the protruded portion 140 are located closest to each other. In order to apply such a voltage, a booster coil or the like may be used. The power supply 160 may apply the voltage continuously or intermittently (e.g., pulse wave voltage). In a case in which the power supply 160 applies the voltage intermittently, the control device 105 controls synchronization with rotation control of the fan blades 128. The DC electrical paths 152 may be connected with one another in series, parallel, or by switching. In a case of being connected by switching, the control device 105 controls synchronization with rotation control of the fan blades 128.

Also, the voltage that the power supply 160 applies may be set to a value that causes gas insulation breakdown between the high voltage electrode 150 and the protruded portion 140 if a distance therebetween become equal to or less than a predetermined value. In such a case, the voltage is applied from the power supply 160 continuously.

The plurality of antennas 170 (A, . . . , M) are equiangularly provided on the inner wall surface of the gas flow path 110 in such a manner as to be in the vicinity of the outer edges of the fan blades 128. Each of the antennas 170 is exposed in the gas flow path 110 at a midpoint of two adjacent high voltage electrodes 150 viewed from a circular direction of the inner wall surface of the gas flow path 110. Each of the antennas 170 is slightly shifted from the high voltage electrodes 150 into an axial direction of the gas flow path 110. The antennas 170 are connected to the electromagnetic oscillator 180 respectively via a plurality of electromagnetic wave transmission paths 172 (A, . . . , M). Also, the antennas 170 may be set at locations corresponding to the high voltage electrodes 150 with respect to the axial direction of the gas flow path 110.

The number of the antennas 170 is not required to be equal to the number of the high voltage electrodes 150, as long as the electromagnetic wave radiated from the antennas 170 can supply energy to the vicinity of the high voltage electrodes 150 adjacent on the both sides thereof in the circumferential direction. This means that one antenna 170 is required to radiate the electromagnetic wave to the two adjacent high voltage electrodes 150 in the vicinity thereof. If the antenna 170 is constituted by a slot antenna or a leakage coaxial cable having a plurality of radiation locations from which respective electromagnetic waves can be radiated with one element, the antennas 170 may be constituted by one antenna. Also, the number of antennas 170 may be greater than the number of the high voltage electrodes 150 as well.

The electromagnetic wave oscillator 180 is, for example, a magnetron of 2.4 GHz band. The electromagnetic wave oscillator 180 supplies energy to charged particles (including electrons and ions) generated by gas insulation breakdown by means of the electric discharger 156. The electromagnetic wave oscillator 180 supplies energy to charged particles in a gas ionization region. The electromagnetic wave oscillator 180 oscillates an electromagnetic wave of energy sufficient to newly ionize the gas by making the charged particles collide with the gas molecules. Frequencies of the electromagnetic wave oscillated by the electromagnetic wave oscillator 180 may be selectively determined as appropriate. For example, an industrially available frequency band such as an ISM (Industry-Science-Medical) band may be selected.

The control device 105 controls the electromagnetic wave oscillator 180 to oscillate an electromagnetic wave pulse when a small-scale plasma is generated by the electric discharge between the high voltage electrode 150 and the ground electrode 140. The control device 105 controls the electromagnetic wave oscillator 180 to cause the antenna 170, which is located closest to the high voltage electrode 150 that generates the small-scale plasma, to radiate the electromagnetic wave. The timing for the electromagnetic wave oscillator 180 to oscillate the electromagnetic wave may be immediately before the small-scale plasma is generated, or may be immediately after the small-scale plasma is generated.

The electromagnetic wave oscillator 180 may be other than a magnetron. Since oscillators of various kinds are available such as a klystron, an LC resonance circuit, a semiconductor oscillator, or other oscillators well known in the art, any one thereof may be selected as appropriate. Since a magnetron of 2.4 GHz band is preferable as the electromagnetic wave oscillator 180 since the magnetron is used in a common microwave oven and therefore inexpensive. The electromagnetic wave transmission paths 152 may be connected with one another in series, parallel, or by switching. In a case of being connected by switching, the control device 105 controls synchronization with rotation control of the fan blades 128.

In the following, a description will be given of an operation of the gas treatment device 100.

When the power source 130 feeds power to the pivot shaft 126, the pivot shaft 126 and the fan blades 128, while being supported by the bearing 124, rotate in the gas flow path 110. Since the gas flow path 110 has a circular cross-section, as the fan blades 128 rotate, the plurality of protruded portions 140 sequentially come into the vicinity of each of the high voltage electrodes 150.

When the power supply 160 applies a voltage to the high voltage electrode 150 to which the protruded portion 140 comes into the vicinity thereof, gas insulation breakdown occurs at a discharge gap between the protruded portion 140 and the high voltage electrode 150, thereby a plasma is generated. In addition, at the timing when a plasma is generated, an electromagnetic wave is supplied from the electromagnetic wave oscillator 180 to an antenna 170, which is located in the closest vicinity of the plasma, the electromagnetic wave is radiated from the antenna 170 and energizes the plasma. Upon receiving the energy of the electromagnetic wave, charged particles in the plasma are accelerated and collide with gas molecules around the plasma to ionize them. As a result thereof, the gas around the plasma also turns into plasma, and thus the plasma region expands. The plasma and reactive molecules (such as hydrogen peroxide) and radicals (such as hydroxyl radicals) in the plasma oxidize and decompose reducing substances (such as hydrocarbon and organic compounds) in the gas.

Effect of First Embodiment

In the present embodiment, the fan 120 (movement unit) moves each of the ground electrodes 140 (moving electrode) so that each of the ground electrodes 140 (moving electrode) sequentially comes into the close vicinity of the plurality of high voltage electrodes 150 (fixed electrodes) to cause an electric discharge between the high voltage electrode 150 and the ground electrode 140 located in the close vicinity thereof. Then, an electromagnetic wave is radiated to the discharging region (ionization region) where the electric discharge occurs.

When the plasma expands, the plasma generation region where the plasma is generated becomes under high temperatures and pressures. Therefore, a gas flowing through the gas flow path 110, though being subject to a chemical reaction aided by the plasma, tends to flow around the plasma. As a result thereof, if the plasma is generated at a fixed location, the amount of gas which flows around the plasma and remains unreacted is increased.

On the other hand, in the present embodiment, since the fan blades 128 rotate, it becomes possible to move a location of plasma generation, or to change the location of plasma. Accordingly, it becomes possible to disperse regions of high temperature and pressure and avoid the situation in which only a fixed location is exposed to high temperatures and high pressures. Therefore, it is possible to increase the amount of gas which comes in contact with the plasma, thereby enabling the large amount of gas to be chemically reacted.

Furthermore, in the present embodiment, since the fan blades 128 rotate, the gas flow path 110 becomes in a state as if it were partially partitioned, and a central region of the gas flow path 110 tends to resist the flow of the gas. Also, since the fan blades 128 rotate, most of the gas is blown onto the inner wall surface of the gas flow path 110 (where the plasma is generated). Therefore, it is possible to further increase the amount of gas which comes in contact with the plasma, thereby further enabling the large amount of gas to be chemically reacted.

Furthermore, in the present embodiment, since the fan blades 128 rotate, it is possible to promote agitation and dispersion of the radicals generated by the plasma. As a result thereof, it is possible to accelerate the gas treatment by the radicals, thereby reducing a phenomenon in which gas just passes through without reaction.

Furthermore, in the present embodiment, since the fan blades 128 rotate, the gas is forcibly conveyed from upstream to downstream. Here, since the plasma generation region becomes under high temperatures and high pressures, some amount of gas flow may tend to be disturbed by the plasma. However, in the present embodiment, the rotation of the fan blades 128 can compensate the amount of gas flow disturbed by the plasma. Accordingly, it is possible to realize a gas treatment using plasma while suppressing the decrease in gas flow amount.

First Modification of First Embodiment

Figure 4:
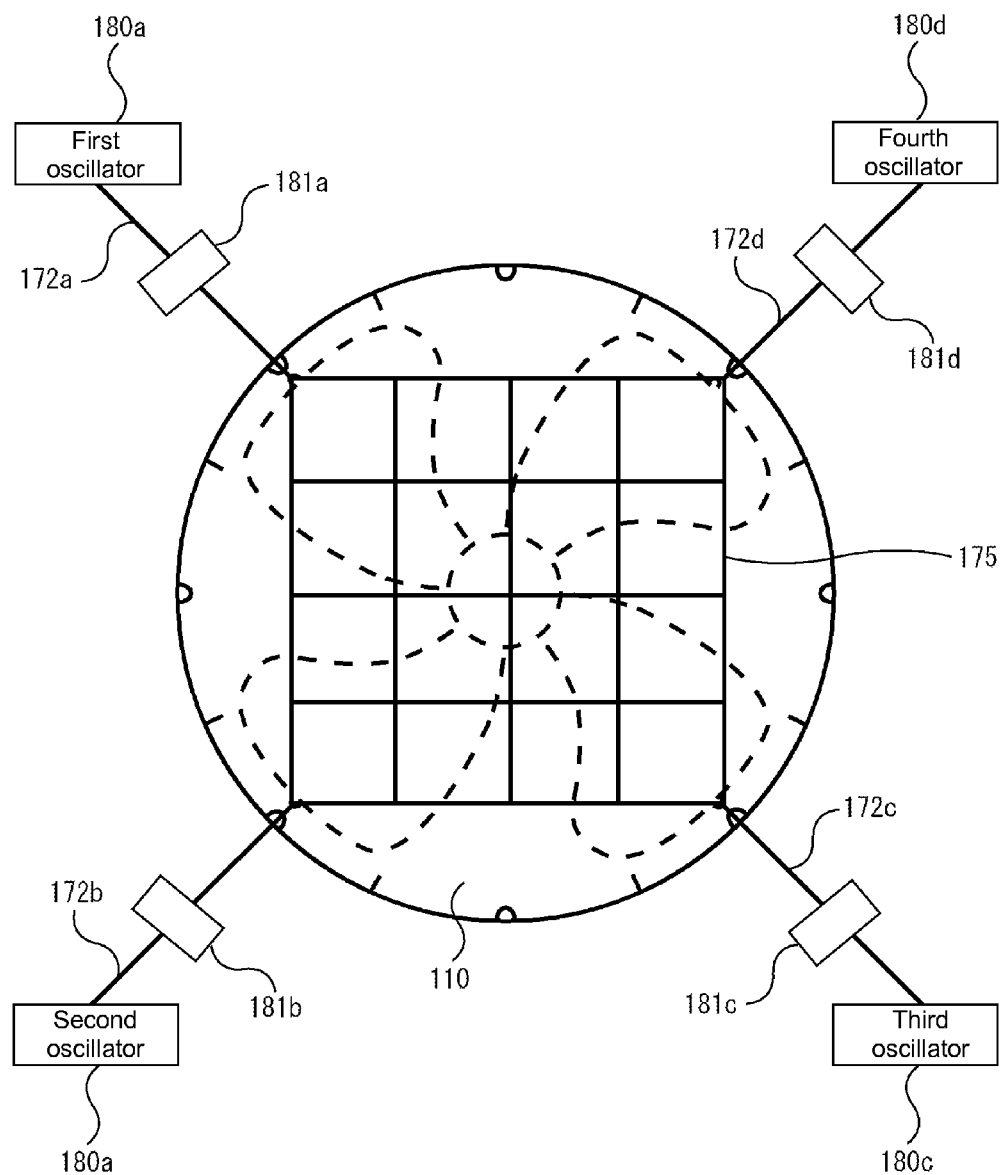
FIG. 4 is a schematic view of a configuration of a gas treatment device according to a first modification of the first embodiment.

In a first modification, as shown in FIG. 4, a net-shaped antenna 175 is disposed so as to face toward a plurality of fan blades 128. A plurality of electromagnetic wave oscillators 180 (a first oscillator 180a, a second oscillator 180b, a third oscillator 180c, and a fourth oscillator 180d in the present first modification) are connected to the net-shaped antenna 175.

In the first modification, when the plurality of electromagnetic wave oscillators 180 oscillate electromagnetic waves, strong electric fields are generated at a plurality of locations around the net-shaped antenna 175. Therefore, it is possible to generate plasmas in the plurality of strong electric fields around the net-shaped antenna 175 as well. Accordingly, it becomes possible to make reacted a gas passing through the vicinity of the center of the fan blades 128. Even if the locations of the strong electric fields around the net-shaped antenna 175 are distant from the discharging regions (gas ionization regions), it is possible to generate plasmas around the strong electric fields by appropriately setting the magnitude of the electromagnetic wave energy.

Figure 5:
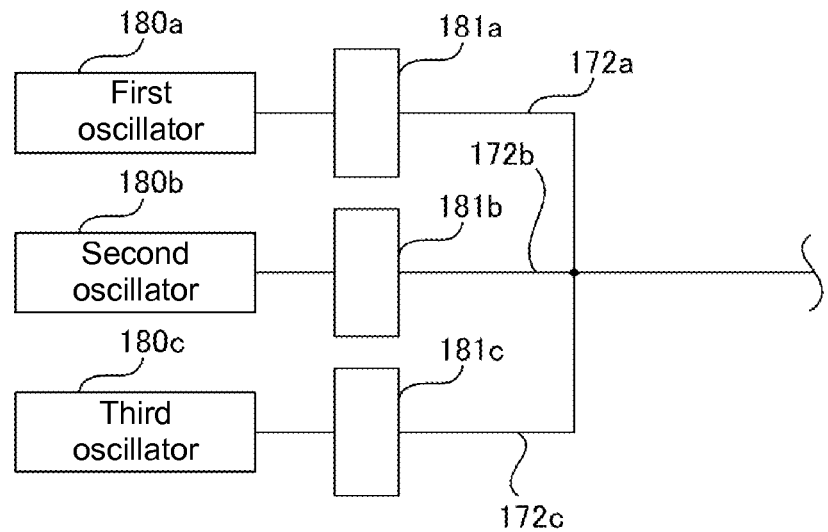
FIG. 5 is a diagram showing a connection configuration of other electromagnetic wave oscillators of the gas treatment device according to the first modification of the first embodiment.

In the first modification, the control device 105 may change the number of electromagnetic wave oscillators 180 that radiate electromagnetic waves at the same timing, so as to change the locations of the strong electric fields. Also, in a case in which the electromagnetic wave oscillators 180 can adjust an oscillating frequency of the electromagnetic wave, the control device 105 may change the oscillating frequency of any one or more of the electromagnetic wave oscillators 180 and thereby change the locations of the strong electric fields. The control device 105 changes the locations of the strong electric fields by way of electrical control. In the first modification, the plurality of electromagnetic wave oscillators 180 are connected to the net-shaped antenna 175 at different locations. However, as shown in FIG. 5, electromagnetic waves from the plurality of electromagnetic wave oscillators 180 may be merged into a single transmission path to be connected to the net-shaped antenna 175. As shown in FIGS. 4 and 5, a plurality of isolators 181 are provided to the respective electromagnetic wave oscillators 180 for protection.

Furthermore, in the first modification, similar to the first embodiment described above, a plurality of antennas 170 are disposed on an inner wall surface of a gas flow path 110. The plurality of antennas 170 are connected to an electromagnetic wave oscillator other than those of the net-shaped antenna 175. However, the plurality of antennas 170 on the inner wall surface of the gas flow path 110 may be eliminated, and the electromagnetic waves may be radiated only from the net-shaped antenna 175.

Furthermore, in the first modification, there are regions in which the net-shaped antenna 175 is not provided in vicinity of the inner wall surface of the gas flow path 110. However, the net-shaped antenna 175 may extend to an entire cross section of the gas flow path 110.

Second Modification of First Embodiment

In the first embodiment described above, as the fan 120 that forcibly conveys a gas toward the plasma side, an axial flow fan has been exemplified as shown in FIGS. 1 and 2. However, in place of the axial flow fan, a centrifugal fan, a diagonal flow fan, or a cross flow fan may be employed. Also, as a mechanism to forcibly convey the gas, for example, a fan in the form of a centrifugal compressor, equipped in a turbocharger for an internal combustion engine or a centrifugal gas turbine engine, may be employed. Furthermore, various types such as Roots type, Lysholm type, scroll type, or rotary type of a compressor may be employed in place of the fan 120.

Figure 6:
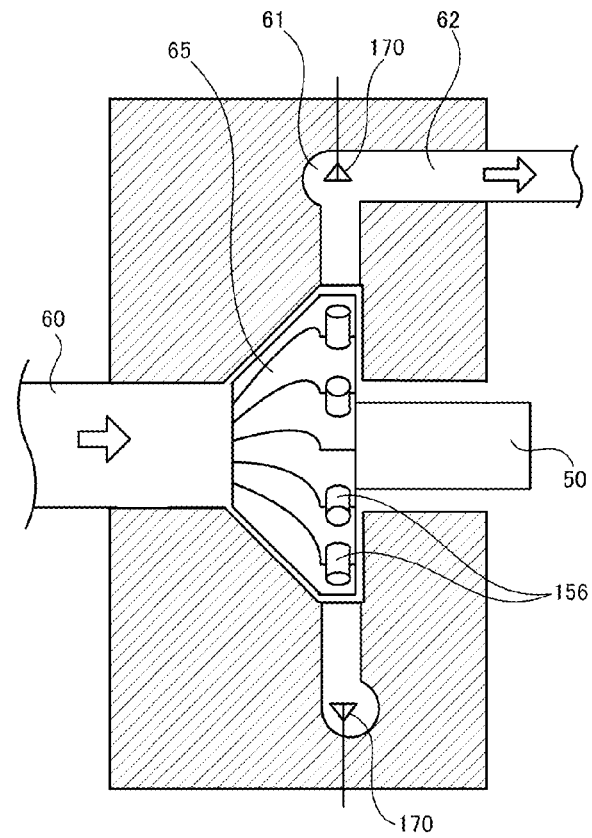
FIG. 6 is a schematic view of a configuration of a gas treatment device according to a second modification of the first embodiment.

In FIG. 6, an electric discharger 156 is attached to a centrifugal fan impeller 65. A plurality of antennas 170 are located on an outer circumference side of the impeller 65 and exposed to an outer circumference space 61 that recovers a dynamic pressure of the gas, for example.

In a second modification, a compression mechanism draws in a gas through an inlet flow path 60 and compresses the gas, and plasmas are generated at a location where the compressed gas flows through. Since the plasmas are subject to change in location, a large amount of gas can be made to contact with the plasmas, thereby making it possible to promote chemical reaction of the gas. The gas having contacted with the plasmas flows through an outlet flow path 62.

In the second modification, an ionization unit is provided with the electric discharger 156 that discharges in discharge gaps between pairs of electrodes. The electric discharger 156 is moved by a movement unit while discharges occur in the discharge gaps. The compression mechanism constitutes the movement unit. Both of discharge electrodes and ground electrodes of the electric discharger 156 are attached to the impeller 65 to which a rotating shaft 50 is connected. In the second modification, a timing for the electric discharger 156 to discharge can be set independently of a rotating speed of the impeller 65. However, similar to the first embodiment described above, only either of the discharge electrodes and the ground electrodes may be attached to the impeller 65.

Third Modification of First Embodiment

Figure 7:
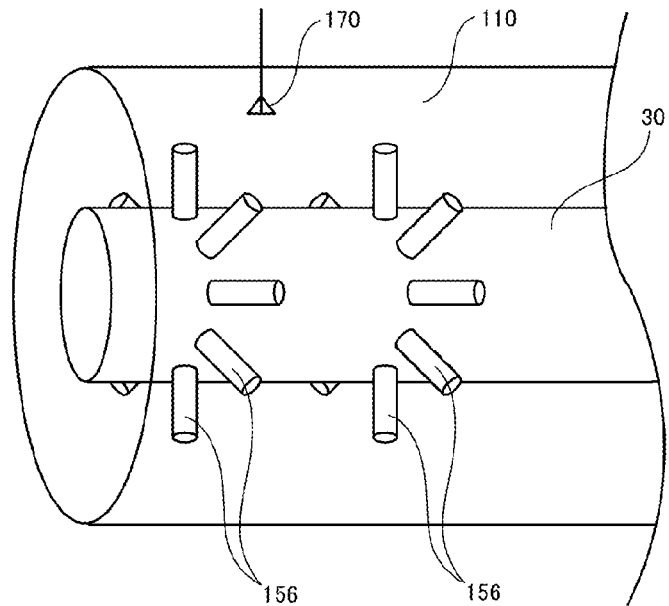
FIG. 7 is a schematic view of a configuration of a gas treatment device according to a third modification of the first embodiment.

In a third modification, as shown in FIG. 7, a gas treatment device is arranged in a cylindrical gas flow path 110. The cylindrical gas flow path 110 is formed between an inner columnar member 30 and an outer cylindrical member. On an outer circumference surface of the columnar member 30, a plurality of electric dischargers 156 are disposed along a circumferential direction. Also along an axial direction, the electric dischargers 156 are disposed in plural arrays. An antenna 170 is attached to the cylindrical member in a manner as to be exposed in the gas flow path 110.

In the third modification, a motor (not shown) feeds power to rotate the columnar member 30. Accordingly, the locations of plasmas are changed, and a large amount of gas can come in contact with the plasmas, thereby making it possible to promote chemical reaction of the gas.

Fourth Modification of First Embodiment

Figure 8:
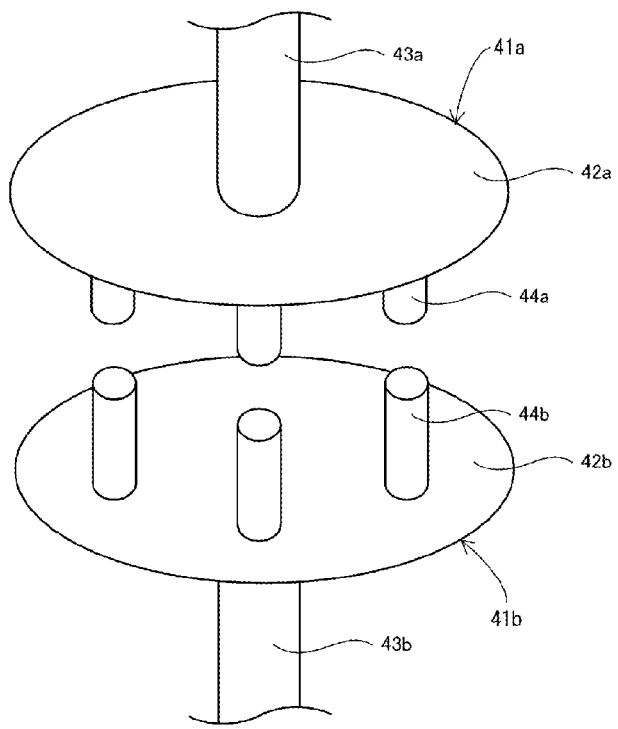
FIG. 8 is a schematic view of a configuration of a gas treatment device according to a fourth modification of the first embodiment.

In a fourth modification, as shown in FIG. 8, a pair of rotating devices 41a and 41b are provided. The rotating discs 42a and 42b are disposed so as to face toward each other. The rotating discs 42a and 42b are connected to respective motors (not shown) via rotating shafts 43a and 43b.

A plurality of discharge electrodes 44a are attached to one of the rotation discs 42a and 42b, and a plurality of ground electrodes 44b are attached to the other of the rotation discs 42a and 42b. The discharge electrode 44a and the ground electrode 44b are disposed facing toward and in the vicinity of each other at various locations in a rotation direction. A control device 105 controls a power supply 60 so as to apply a high voltage to the discharge electrode 44a that is disposed facing toward the ground electrode 44b. As a result thereof, a discharge occurs between the discharge electrode 44a and ground electrode 44b that are disposed facing toward each other. Furthermore, similar to the first embodiment described above, the control device 105 controls an electromagnetic wave oscillator to radiate an electromagnetic wave to the discharging region. An antenna 170 is not illustrated in FIG. 8.

Other Modifications of First Embodiment

In the first embodiment described above, both the high voltage electrodes 150 and the antennas 170 are attached to a constituent member of the gas flow path 110. However, the high voltage electrodes 150 and the antennas 170 may be attached to the fan blades 128. In such a case, a mechanism of supplying power and electromagnetic waves to a rotating member for insulation breakdown is additionally provided. It is possible to transmit the electromagnetic wave to the rotating member by way of contactless transmission methods such as a wireless method, a capacitive coupling method, or an inductive coupling method. With regard to the voltage for insulation breakdown, as long as an appropriate voltage is applied at an appropriate timing, it is not necessary to apply a DC voltage. Therefore, by converting the voltage for insulation breakdown to an AC voltage or an electromagnetic wave, it is possible to convey energy in a contactless manner.

Furthermore, locations used for gas insulation breakdown and for radiating an electromagnetic wave are selectable. This means those locations may be selected as appropriate.

Second Embodiment

Figure 9:
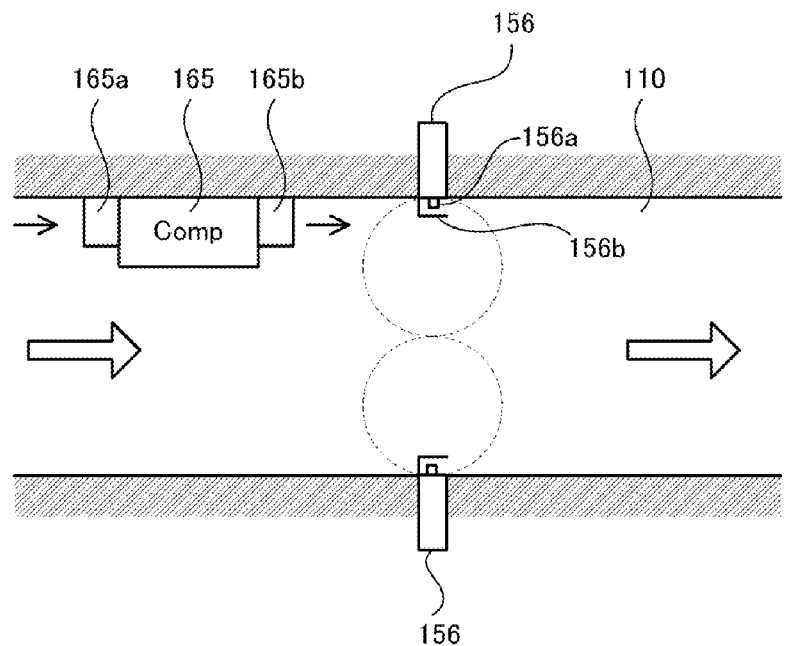
FIG. 9 is a schematic view of a configuration of a gas treatment device according to a second embodiment.

As shown in FIG. 9, a gas treatment device 100 of a second embodiment is provided with electric dischargers 156, a power supply 160, an electromagnetic wave oscillator 180, and a compressor 165. The power supply and the electromagnetic wave oscillator are not illustrated in FIG. 9. In the second embodiment, discharge electrodes 156a of the electric dischargers 156 also serve as antennas. The discharge electrodes 156a are connected to the power supply 160 and the electromagnetic wave oscillator 180 via a mixer circuit that mixes a high voltage pulse and an electromagnetic wave pulse. When the high voltage pulse and the electromagnetic wave pulse are supplied to the discharge electrodes 156a, a small-scale plasma is generated by a discharge at a discharge gap between the discharge electrode 156a and the ground electrode 156b, and the plasma absorbs the electromagnetic wave energy and expands.

Furthermore, the compressor 165 draws in through an inlet 165a a part of a gas flowing in the gas flow path 110, compresses the drawn-in gas, and expels the compressed gas through an outlet 165b toward the plasma generation region. Accordingly, it becomes possible to cause a large amount of the compressed gas to come in contact with the plasma and to promote chemical reaction of the gas. The compressor 165 constitutes a compression unit for forwarding the compressed gas to a region where the plasma is generated.

Also, the gas treatment device 100 may be provided so that a plasma is generated at a location where negative pressure occurs caused by the ejector effect.

Third Embodiment

In the first embodiment, a gas flow toward a plasma has been forcibly made. However, it is also possible to utilize rises in temperature and in pressure accompanied with plasma generation, for gas inflation at a lower stream of the plasma generation region. An energy inputted for the plasma generation is used to raise the gas temperature and pressure, which assists gas inflation. Furthermore, since the plasma acts to promote chemical reaction of the gas, the amount of gas molecules increases if the composition of the gas to be treated is such that the number of molecules increases due to oxidation reaction. This brings an effect similar to improving combustion efficiency in an internal combustion engine.

Therefore, by incorporating the gas treatment device according to the first embodiment into a combustion device such as an internal combustion engine, it becomes possible to enhance combustion efficiency.

Figure 10:
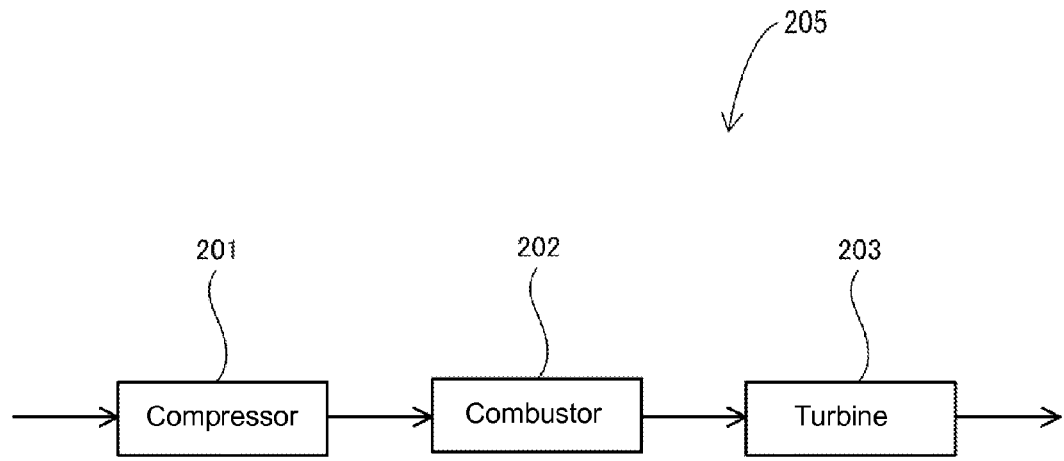
FIG. 10 is a block diagram of a gas turbine described in a third embodiment.

In the following, a description will be given with reference to FIG. 10 of a third embodiment exemplified assuming that the internal combustion engine is a gas turbine 205. The gas turbine 205 is provided with a compressor 201 that compresses a drawn-in gas, a combustor 202 that combusts the gas compressed by the compressor 201, a turbine 203 that rotates by the gas combusted in the combustor 202. In the gas turbine 205, power recovered by the turbine 203 is fed to the compressor 201 via a rotating shaft of the turbine 203.

The gas treatment device 100 of the first embodiment is installed in the compressor 201, for example. In this case, the plasma generated by the gas treatment device 100 generates radicals. The radicals can promote combustion in the combustor 202. In addition, a pressure rise caused by the plasma is added to an exhaust pressure. Therefore, it becomes possible to enhance energy efficiency of the internal combustion engine by recovering the exhaust pressure on a downstream side.

The gas treatment device 100 of the first embodiment is preferably installed at a lowest stream of a compressor impeller, in a case in which the internal combustion engine is a centrifugal gas turbine, or at a lowest stream of a rotor blade or a stator vane, in a case in which the internal combustion engine is an axial flow gas turbine.

Also, the gas treatment device 100 of the first embodiment may be installed in the turbine 203, for example. In this case, it becomes possible to react an unburnt gas that has passed through the combustor 202 and thereby convert the reaction energy into power. In addition, a pressure rise caused by the plasma can be recovered for use by a turbine impeller or a turbine blade (not shown) provided at a downstream of the turbine 203. The pressure rise may be recovered and used as the exhaust gas's own kinetic energy.

It is preferable that the gas treatment device 100 of the first embodiment is installed at an uppermost stream of a turbine impeller, in a case in which the internal combustion engine is a centrifugal gas turbine, or at an uppermost stream of a turbine blade, in a case in which the internal combustion engine is an axial flow gas turbine.

Fourth Embodiment

Figure 11:
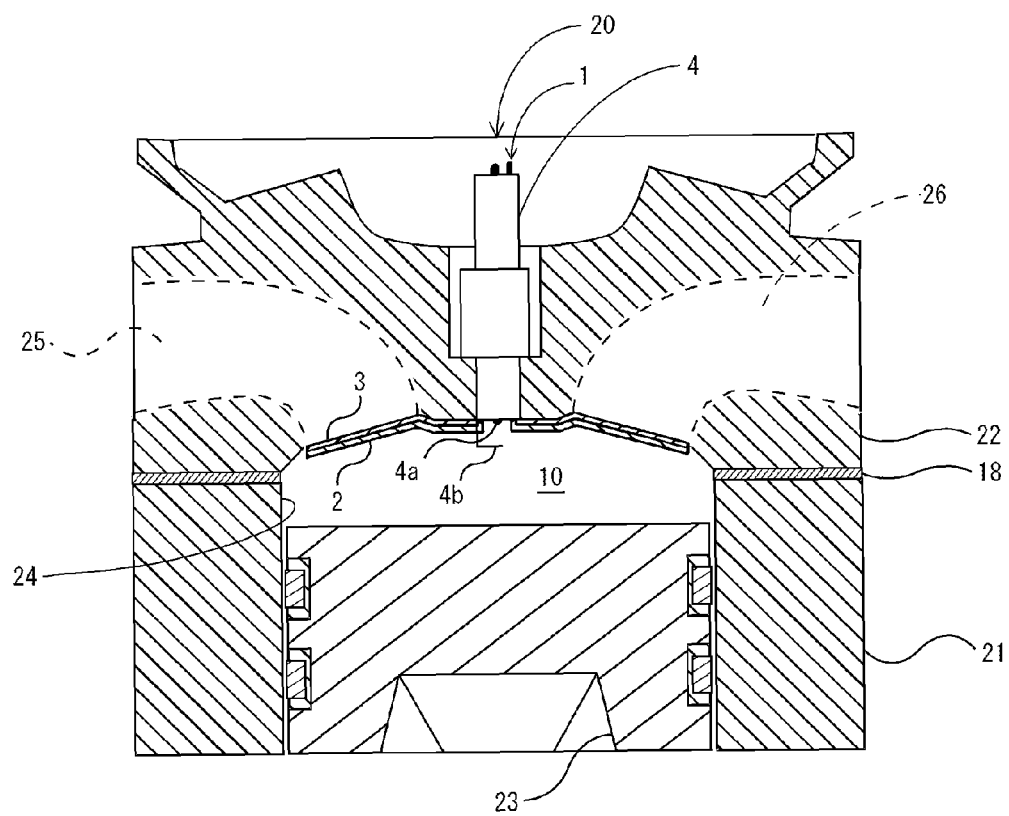
FIG. 11 is a cross-section view of an internal combustion engine described in a fourth embodiment.

As shown in FIG. 11, a gas treatment device 100 of a fourth embodiment is installed in a reciprocating type internal combustion engine in which a reciprocating piston 23 reciprocates. The internal combustion engine is provided with a cylinder block 21, a cylinder head 22, and the piston 23. A plurality of cylinders 24 each having a circular cross section are formed in the cylinder block 21. The piston 23 is slidably provided in each of the cylinders 24. The piston 23 is connected to a crankshaft via a connecting rod (not shown). The crankshaft is rotatably supported by the cylinder block 21.

The cylinder head 22 is carried on the cylinder block 21 having a gasket 18 intervening therebetween. The cylinder head 22 defines a combustion chamber 10 along with the cylinder 24 and the piston 23. A spark plug 4 is attached to the cylinder head 22 for each of the cylinders 24. One or more intake ports 25 and one or more exhaust ports 26 are formed in the cylinder head 22 for each of the cylinders 24. An intake valve that opens and closes the intake port 25 and an injector (fuel injection device) that injects fuel are attached to the intake port 25. On the other hand, an exhaust valve that opens and closes the exhaust port 26 is attached to the exhaust port 26.

In the fourth embodiment, the spark plug 4 constitutes an ionization unit that ionizes a gas in the combustion chamber 10 that constitutes a target space. An electromagnetic wave transmission path 1 connected to an electromagnetic wave oscillator (not shown) is attached to the spark plug 4. The electromagnetic wave transmission path 1 is connected to an antenna 2 attached on a surface of the cylinder head 22. The surface of the cylinder head 22 is exposed in the combustion chamber 10. The antenna 2 extends in a radius direction of the combustion chamber 10 and passing between the intake port 25 and the exhaust port 26. The antenna 2 is insulated from the cylinder head 22 by means of an insulation member 3. The antenna 2 radiates an electromagnetic wave supplied from the electromagnetic wave oscillator to the combustion chamber 10, in which the gas ionized by the spark plug 4 is provided. The gas treatment device generates plasma by causing of the spark plug 4 to discharge in an air-fuel mixture gas and causing the antenna 2 to radiate an electromagnetic wave thereto.

After the plasma is generated, the gas treatment device changes a frequency of the electromagnetic wave radiated from the antenna 2, thereby continuously changes a location of a strong electric field generated by the electromagnetic wave, and thereby moves the plasma. For example, after the spark plug 4 sparks, it is possible for the strong electric field to be moved in the location from a center to an outer side of the antenna 2, thereby moving the plasma from the center side to the outer side thereof.

A plurality of electromagnetic wave oscillators may be connected to the antenna 2. In this case, by changing a wave length of an electromagnetic wave oscillated by at least one of the electromagnetic wave oscillators after the plasma is generated, the location of the strong electric field region can be continuously changed, and it becomes to possible to move the plasma.

Other Embodiments

The embodiments described above may also be configured as follows.

In the embodiments described above, the ionization unit may shift the timing of turning gas into plasma among the plurality of electric dischargers 156. For example, the plurality of electric dischargers 156 may sequentially turn gas into plasma in a predetermined cycle. In such a case, compared to the case in which the plurality of electric dischargers 156 simultaneously turn gas into plasma, electromagnetic wave energy absorbed by one plasma is increased. Accordingly, it becomes possible to further expand the plasma.

INDUSTRIAL APPLICABILITY

As described above, the present invention is useful for a gas treatment device using plasma and an internal combustion engine to which the gas treatment device is applied.

EXPLANATION OF REFERENCE NUMERALS 100 gas treatment device
110 gas flow path
120 fan (movement unit)
140 protruded portion (moving electrode, electric discharger)
150 high voltage electrode (fixed electrode, electric discharger)
160 DC power supply
170 antenna
180 electromagnetic wave oscillator

The invention claimed is:

1. A gas treatment device, comprising:

a gas flow path having an inside wall surface and an axial direction along which a gas flows;

a multiple fixed electrodes fixed to the inside wall surface;

a fan having a fan blade and a shaft that supports the fan in the gas flow path in a manner that rotates an outer circumferential surface of the fan blade along the inside wall surface;

a moving electrode provided to the outer circumferential surface of the fan blade;

a power supply that supplies an electric power to the fixed electrode to generate an electric discharge in a gap between the fixed electrodes and the moving electrode; and at least one antenna located at the inner wall surface of the gas flow path at a location shifted from the fixed electrodes in the axial direction and each of the antenna is exposed in the gas flow path at a midpoint of the two adjacent fixed electrodes and an electromagnetic wave oscillator that oscillates an electromagnetic wave to the antenna so as to radiate the electromagnetic wave to said gap via the antenna, wherein the shaft and fan blade of the fan comprise conductive material via which the moving electrode is grounded.

2. The gas treatment device according to claim 1, further comprising:

an antenna formed in a net shape that extends across an axial center of the gas flow path.

* * * * *